US012810581B1

(12) United States Patent
Navot et al.

(10) Patent No.: US 12,810,581 B1
(45) Date of Patent: Nov. 24, 2026

(54) MULTI-MODAL VEHICLE DAMAGE COMPARISON WITH VIEWPOINT INVARIANCE

(71) Applicant: UVeye Ltd., Tel Aviv (IL)

(72) Inventors: Shira Navot, Herzliya (IL); Yonatan Moskovitz, RaAnana (IL); Shirel Gazit, London (GB); Itai Orr, Or Akiva (IL)

(73) Assignee: UVeye Ltd., Tel Aviv (IL)

( * ) Notice: Subject to any disclaimer, the term of this patent is extended or adjusted under 35 U.S.C. 154(b) by 0 days.

(21) Appl. No.: 19/634,308

(22) Filed: Mar. 31, 2026

(51) Int. Cl.

| | |
|---|---|
| ***G06V 10/74*** | (2022.01) |
| ***G06V 10/12*** | (2022.01) |
| ***G06V 10/25*** | (2022.01) |
| ***G06V 10/26*** | (2022.01) |
| ***G06V 10/70*** | (2022.01) |

(Continued)

(52) U.S. Cl.
CPC ............ *G06V 10/761* (2022.01); *G06V 10/12* (2022.01); *G06V 10/25* (2022.01); *G06V 10/26* (2022.01); *G06V 10/751* (2022.01); *G06V 10/753* (2022.01); *G06V 10/764* (2022.01); *G06V 10/87* (2022.01); *G06V 2201/08* (2022.01)

(58) Field of Classification Search
CPC .......... G06T 2207/30252; G06T 7/001; G06V 10/761; G06V 10/12; G06V 10/25; G06V 10/26; G06V 10/751; G06V 10/753; G06V 10/764; G06V 10/87; G06V 2201/08
See application file for complete search history.

(56) References Cited

U.S. PATENT DOCUMENTS 11,915,479 B1 * 2/2024 Lavie ........................ G06N 3/08
2018/0260793 A1 * 9/2018 Li .......................... G06N 20/20
(Continued)

FOREIGN PATENT DOCUMENTS

CN 104809732 A * 7/2015 ........... G06T 7/0008
JP 2026038261 A * 3/2026

OTHER PUBLICATIONS

El Saer A, et al. A Novel Framework for Image Matching and Stitching for Moving Car Inspection under Illumination Challenges. Sensors. 2024; 24(4):1083. https://doi.org/10.3390/s24041083 (Year: 2024).*

*Primary Examiner* — John B Strege
*Assistant Examiner* — Chandhana Pedapati

(57) ABSTRACT

An inspection system for vehicle damage assessment comprising a camera array having a plurality of cameras arranged along a vehicle drive-through lane, at least one processor, and memory storing instructions that, when executed, cause the system to: receive a current scan and a previous scan of a same vehicle captured during different vehicle passes; identify corresponding frame pairs between the scans by computing feature vectors and selecting frame pairs based on a similarity measure; determine a damage assessment by projecting damage annotations from the previous scan onto current frames using a geometric transformation estimated from keypoint correspondences; and store the damage assessment in association with a vehicle record, the damage assessment comprising a damage classification indicating whether damage is new or pre-existing, a confidence score, and metadata. In some embodiments, the system adaptively selects between geometric and semantic comparison pathways based on quality metrics of the geometric transformation.

19 Claims, 2 Drawing Sheets

Figure 1:
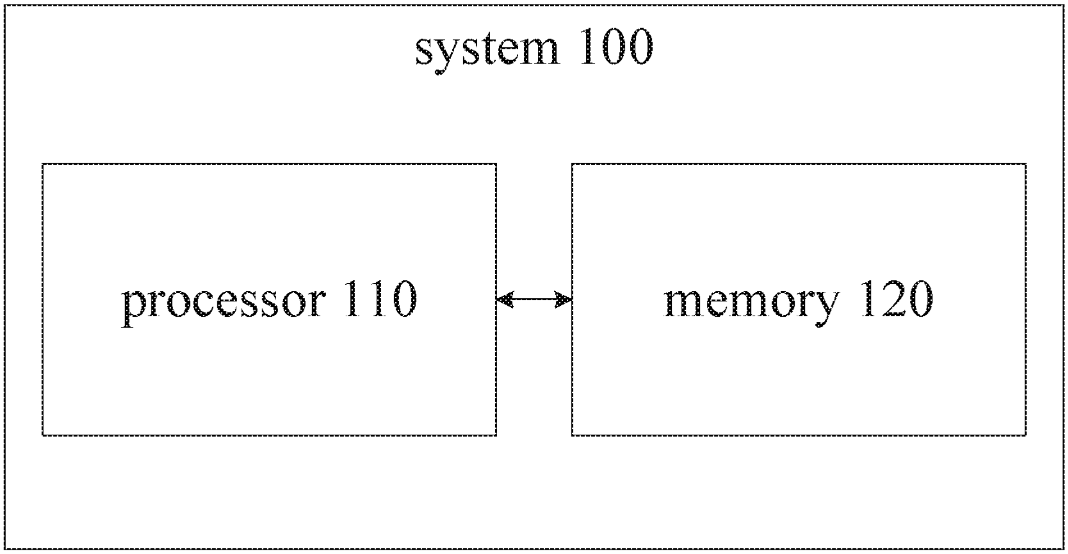

(51) Int. Cl.
*G06V 10/75* (2022.01)
*G06V 10/764* (2022.01)

(56) References Cited

U.S. PATENT DOCUMENTS

2021/0166366 A1* 6/2021 Kong ........................ G06T 5/70
2021/0326601 A1* 10/2021 Tang .................... G05D 1/0221

* cited by examiner

MULTI-MODAL VEHICLE DAMAGE COMPARISON WITH VIEWPOINT INVARIANCE

FIELD AND BACKGROUND OF THE INVENTION

The present invention, in some embodiments thereof, relates to vehicle inspection and, more particularly, but not exclusively, to multi-modal vehicle damage comparison with viewpoint invariance.

Vehicle inspection systems are used across a range of commercial contexts, including automotive rental companies (billing for damages and seeking to resolve disputes), fleet management operations (tracking vehicle maintenance), insurance providers (verifying damage claims), vehicle inspection stations (ensuring regulatory compliance), and ride-sharing services (establishing driver accountability). A challenge across all these contexts is determining whether detected damage is new (occurred since the last inspection) or pre-existing, which previous damage corresponds to a current detection, and whether existing damage has worsened.

Multi-camera vehicle inspection systems capture hundreds of frames per vehicle pass using arrays of cameras arranged at fixed positions along a drive-through lane. Each camera in the array captures a different portion of the vehicle exterior. When a vehicle passes through the inspection system on two separate occasions, the captured frames typically differ in camera perspective, illumination, vehicle position within the lane, vehicle speed, and environmental conditions. These differences are inherent to the physical capture process and are not merely data-formatting differences that could be resolved through conventional image scaling or color correction. As a result, a damage annotation associated with a location on the vehicle in a previous scan cannot be directly compared to a corresponding location in a current scan without accounting for the geometric and photometric transformations introduced by the capture process itself.

SUMMARY OF THE INVENTION

Existing vehicle inspection systems may struggle with viewpoint variation, where vehicles rarely pass through the inspection system in the same position and velocity. Environmental conditions may also differ between scans including lighting, weather, and surface conditions that cause the same physical surface to appear geometrically and visually different across scans. In addition, there may be temporal discontinuity where days, weeks, or months pass between scans. A vehicle inspection system may process thousands of frame pairs per day across multiple sites and may be required to meet accuracy requirements including preventing false positives that frustrate clients when new damage is marked as pre-existing, and preventing false negatives that cause disputes when pre-existing damage is marked as new.

Current systems may struggle with lighting changes and reflections between scans and may not implement mask filtering to exclude non-rigid vehicle components that may violate planar homography assumptions. While some systems achieve good results on general matching benchmarks, they may not provide an end-to-end pipeline from frame matching to damage annotation projection with quality control specifically designed for automotive inspection workflows. Furthermore, some systems may not reduce matching computation by propagating frame matches from representative cameras to all cameras in a physical group, limiting scalability across multi-camera inspection installations.

With the integration of machine learning (ML) into vehicle inspection workflows, some systems have incorporated learned feature matchers or vision-language models (VLMs) for damage analysis. ML-based systems may apply these models in isolation rather than combining self-supervised vision embeddings, learned dense matchers, and VLM reasoning into a single coordinated workflow for vehicle damage comparison. Additionally, some VLM approaches may not implement coordinate-aware asymmetric visual prompting, where a visual marker is placed only on the current frame to guide model attention without biasing the model toward detecting damage in the previous frame. Homography-based alignment systems developed for document scanning and panorama stitching may not provide damage annotation projection with coordinate system transformations and validation. Object tracking systems match detections across consecutive frames using motion prediction and intersection-over-union (IoU) but require temporal continuity and may not address comparison of the same vehicle across separate scans.

As a result, the above-described technical limitations create a specific technical problem rooted in the operation of multi-camera vehicle inspection systems: the inability to reliably and automatically compare damage annotations across temporally discontinuous vehicle scans captured under varying physical conditions. This is not merely an abstract desire for better analysis, but rather a deficiency in the functioning of the inspection system itself the system produces unreliable outputs (false positives and false negatives in damage change detection) because no existing single-tier approach adequately handles the full range of geometric, photometric, and semantic variation inherent to the physical capture environment.

There is thus a need for multi-modal vehicle damage comparison with viewpoint invariance.

According to an aspect of some embodiments of the present invention there is provided an inspection system for vehicle damage assessment comprising: a camera array comprising a plurality of cameras arranged along a vehicle drive-through lane, the camera array configured to capture a plurality of frames of a vehicle exterior during a vehicle pass; at least one processor communicatively coupled to the camera array; and at least one memory storing instructions that, when executed by the at least one processor, cause the system to: receive a current scan comprising a plurality of current frames captured by the camera array during a current vehicle pass and a previous scan comprising a plurality of previous frames captured by the camera array during a previous vehicle pass of a same vehicle; identify one or more corresponding frame pairs between the current scan and the previous scan by computing feature vectors from the current frames and the previous frames and selecting frame pairs based on a similarity measure applied to the feature vectors; determine a damage assessment for the current scan by projecting one or more damage annotations from the previous scan onto one or more current frames of the one or more corresponding frame pairs using a geometric transformation estimated from keypoint correspondences between each corresponding frame pair; and store the damage assessment in association with a vehicle record in a vehicle inspection database, the damage assessment comprising a damage classification indicating whether damage depicted in the current scan is new damage or pre-existing damage, a confidence score, and metadata linking the damage classification to at least one frame of the current scan.

Optionally, determining the damage assessment further comprises adaptively selecting between a geometric comparison pathway and a semantic comparison pathway based on a quality metric derived from the geometric transformation, wherein the semantic comparison pathway is invoked when the quality metric falls below a threshold.

Optionally, the geometric comparison pathway comprises projecting the one or more damage annotations using a homography transformation estimated from filtered keypoint correspondences, and the semantic comparison pathway comprises submitting paired frames and coordinate information to a model configured to process image and text inputs.

Optionally, the quality metric comprises at least one of: an inlier count from the geometric transformation estimation, a reprojection error, and a frame similarity score.

Optionally, the one or more corresponding frame pairs are identified using embedding vectors from a self-supervised vision model, the embedding vectors being L2-normalized, and the similarity measure comprises cosine similarity.

Optionally, each of the one or more corresponding frame pairs is associated with at least one of: a current scan frame identifier, a previous scan frame identifier, a similarity score, a confidence metric, a timestamp associated with the current scan, a timestamp associated with the previous scan, and a camera identifier.

Optionally, the system is further configured to propagate frame correspondences from a representative camera to other cameras in a predefined camera group, the predefined camera group comprising cameras having overlapping or adjacent fields of view within the camera array.

Optionally, the camera array comprises at least four cameras, the plurality of frames captured per vehicle pass comprises at least twenty frames, and the current vehicle pass and the previous vehicle pass are separated by at least one hour.

Optionally, storing the damage assessment further comprises at least one of: updating a damage history timeline for the vehicle, generating a differential damage report identifying changes between the current scan and the previous scan, and transmitting an alert to a fleet management system or insurance processing system.

Optionally, projecting one or more damage annotations further comprises: receiving, from the camera array, a current frame and a corresponding previous frame, the current frame and the corresponding previous frame depicting overlapping regions of an exterior surface of a vehicle; extracting at least one keypoint correspondence between the current frame and the corresponding previous frame using a learned dense correspondence model; filtering the at least one keypoint correspondence by excluding keypoints falling within predetermined vehicle regions identified by a vehicle part segmentation model applied to at least one of the current frame and the corresponding previous frame; estimating a homography transformation from the filtered at least one keypoint correspondence using a point normalization procedure; projecting one or more damage annotation bounding boxes from the previous frame to the current frame using the estimated homography transformation; and injecting each of the one or more projected damage annotation bounding boxes into a detection pipeline of the vehicle inspection system with metadata indicating a projection origin, the metadata enabling each projected damage annotation bounding box to participate in clustering with newly detected damage annotations in the detection pipeline.

Optionally, estimating the homography comprises: normalizing keypoint coordinates of the filtered at least one keypoint correspondence from an original coordinate space such that a centroid of the keypoint coordinates is at an origin and an average distance from the origin is $\sqrt{2}$; computing the homography transformation from the normalized keypoint coordinates using a random sample consensus (RANSAC) procedure with a threshold adjusted for the normalized coordinate space; and denormalizing the computed homography transformation to the original coordinate space.

Optionally, computing the homography transformation further comprises iterative refinement with a decreasing inlier threshold.

Optionally, projecting the one or more damage annotation bounding boxes comprises: converting bounding box coordinates from a normalized coordinate space to pixel coordinates; applying the homography transformation to corner points of each of the one or more damage annotation bounding boxes; computing an axis-aligned bounding box from the transformed corner points; clipping the computed axis-aligned bounding box to image bounds of the current frame; validating the clipped computed axis-aligned bounding box has a positive area; and renormalizing the validated clipped computed axis-aligned bounding box to the normalized coordinate space.

Optionally, the predetermined vehicle regions comprise at least one of: rotating vehicle components, light-reflective surfaces, surfaces containing alphanumeric text, moving vehicle components, vehicle components having dimensions insufficient to produce reliable keypoint correspondences, and background regions.

Optionally, the metadata further comprises at least one of an original damage identifier from the previous scan, a projection confidence score, and a non-synthetic flag, the non-synthetic flag enabling each projected damage annotation bounding box to be processed identically to newly detected damage annotations in the detection pipeline without special-case handling.

According to another aspect of some embodiments of the present invention there is provided a method for determining vehicle damage in a vehicle inspection system comprising a camera array, the method comprising: obtaining, from the camera array, a current frame depicting a damage region of a vehicle and a corresponding previous frame depicting a corresponding region of the vehicle, wherein the current frame and the corresponding previous frame are captured during different vehicle passes through the vehicle inspection system; overlaying a damage annotation bounding box on the current frame at a location corresponding to the damage region without overlaying a damage annotation bounding box on the corresponding previous frame, the asymmetric overlaying configured to direct attention of a model to the damage region in the current frame without biasing the model toward identifying damage in the corresponding previous frame; constructing a prompt comprising the current frame with the overlaid damage annotation bounding box, the corresponding previous frame without a damage annotation bounding box, and coordinate information specifying a location of the damage region within the current frame; submitting the prompt to a model configured to process image and text inputs; parsing a response from the model to extract a vehicle damage determination comprising a damage classification indicating whether the damage region depicts new damage or pre-existing damage, a confidence score, and metadata; and when the damage classification indicates pre-existing damage, performing spatial matching to link the damage region to a prior damage record by computing a weighted score from at least one of an intersection-over-union, a centroid distance, and a size similarity between the damage region and one or more candidate prior damage annotations.

Optionally, constructing the prompt further comprises cropping the current frame and the corresponding previous frame to a region around the damage region with configurable padding.

Optionally, the coordinate information comprises crop-relative coordinates specifying the location of the damage region relative to a cropped region of the current frame.

Optionally, the prompt further comprises a set of reference examples comprising at least one of: an example where identical damage is present in both a first frame and a second frame, an example where a first frame depicts a damaged surface and a second frame depicts a clean surface, an example of existing damage with a lighting difference between a first frame and a second frame, an example of new damage depicted in a first frame and a second frame depicting visual noise without damage, and an example of existing damage that is subtle in a second frame.

Optionally, the corresponding previous frame and the current frame depict the same vehicle part as determined by a vehicle part segmentation model.

Optionally, performing spatial matching further comprises filtering candidate prior damage annotations by a vehicle part identifier match and by a minimum visibility threshold within a cropped region.

According to another aspect of some embodiments of the present invention there is provided an inspection method for vehicle damage assessment using a vehicle inspection system comprising a camera array having a plurality of cameras arranged along a vehicle drive-through lane, the method comprising: capturing a current scan comprising a plurality of current frames during a current vehicle pass through the vehicle drive-through lane; retrieving a previous scan comprising a plurality of previous frames and associated damage annotations captured during a previous vehicle pass of a same vehicle; identifying one or more corresponding frame pairs between the current scan and the previous scan by computing embedding vectors from the current frames and the previous frames using a self-supervised vision model and selecting frame pairs having a cosine similarity above a similarity threshold; for each corresponding frame pair having an associated damage annotation in the previous scan, performing a geometric comparison comprising estimating a geometric transformation between the corresponding frame pair and projecting the associated damage annotation from a previous frame to a current frame using the estimated geometric transformation; evaluating a quality metric of the geometric comparison for each corresponding frame pair; for each corresponding frame pair for which the quality metric falls below a quality threshold, performing a semantic comparison comprising submitting paired frames with coordinate-aware asymmetric visual prompting to a model configured to process image and text inputs and parsing a response from the model to extract a damage classification; and generating a damage assessment output comprising, for each damage region in the current scan, a damage classification indicating whether the damage region depicts new damage or pre-existing damage, a confidence score, and a comparison pathway indicator identifying whether the damage classification was produced by the geometric comparison or the semantic comparison.

Optionally, the method further comprises storing the damage assessment output in association with a vehicle identifier in a vehicle inspection database and generating a differential damage report.

Optionally, the method further comprises propagating frame correspondences from a representative camera to other cameras in a predefined camera group to reduce a number of embedding vector computations.

According to another aspect of some embodiments of the present invention there is provided a non-transitory computer-readable medium storing instructions that, when executed by at least one processor communicatively coupled to a camera array comprising a plurality of cameras arranged along a vehicle drive-through lane, cause the at least one processor to perform a method comprising: receiving a current scan comprising a plurality of current frames captured by the camera array during a current vehicle pass and a previous scan comprising a plurality of previous frames captured by the camera array during a previous vehicle pass of a same vehicle; identifying one or more corresponding frame pairs between the current scan and the previous scan by computing feature vectors from the current frames and the previous frames and selecting frame pairs based on a similarity measure applied to the feature vectors; determining a damage assessment for the current scan by projecting one or more damage annotations from the previous scan onto one or more current frames of the one or more corresponding frame pairs using a geometric transformation estimated from keypoint correspondences between each corresponding frame pair; and storing the damage assessment in association with a vehicle record, the damage assessment comprising a damage classification indicating whether damage depicted in the current scan is new damage or pre-existing damage, a confidence score, and metadata linking the damage classification to at least one frame of the current scan.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions.

Optionally, the data processor includes a volatile memory for storing instructions and/or data and/or a non-volatile storage, for example, a magnetic hard-disk and/or removable media, for storing instructions and/or data.

Optionally, a network connection is provided as well. A display and/or a user input device such as a keyboard or mouse are provided as well.

BRIEF DESCRIPTION OF THE SEVERAL VIEWS OF THE DRAWING(S)

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

Figure 2:
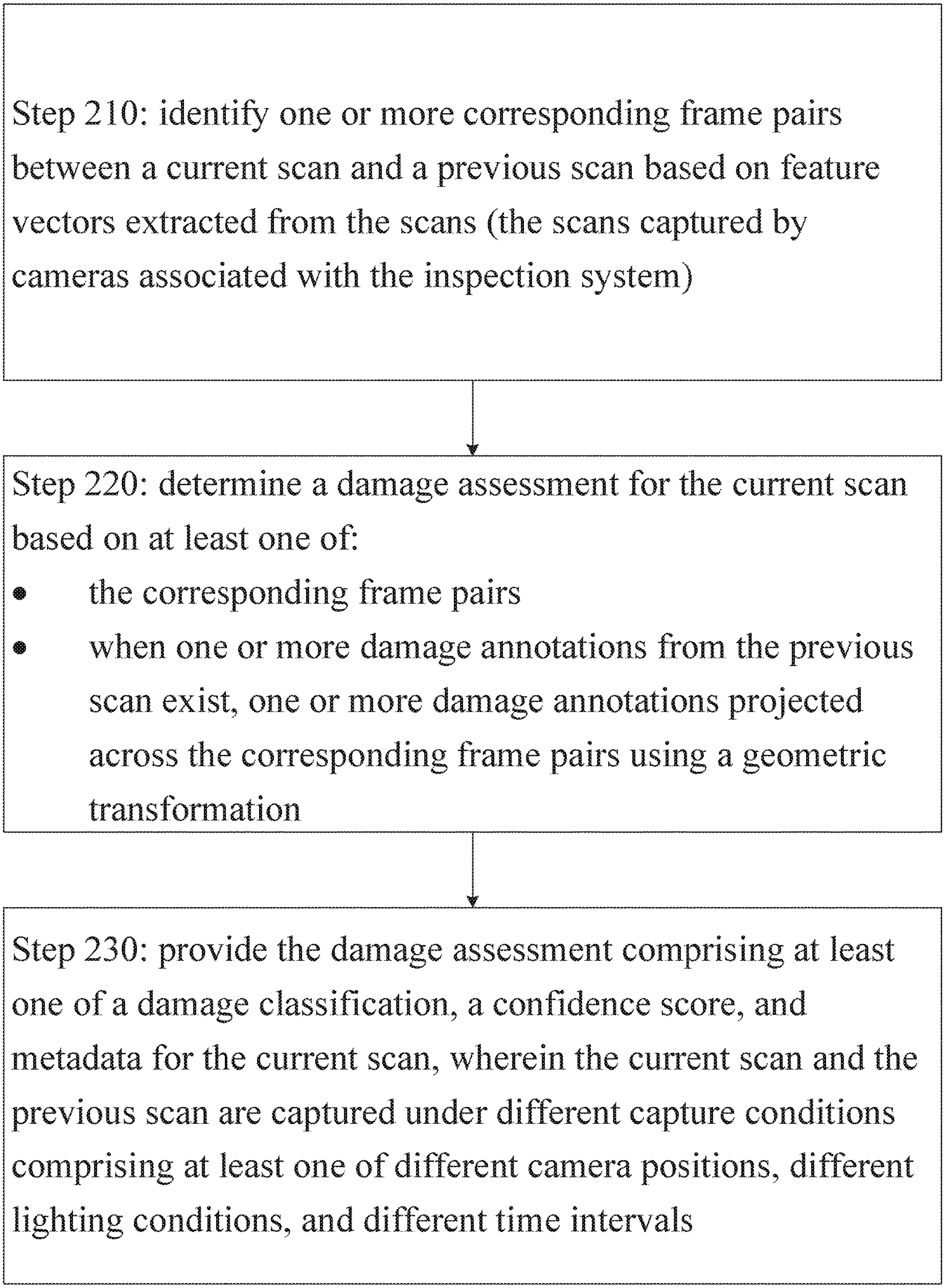

In the drawings:

FIG. 1 is a block diagram of an inspection system 100 for vehicle damage assessment, in accordance with some embodiments of the present invention; and FIG. 2 is a flowchart of example operations performed by the inspection system for vehicle damage assessment, in accordance with some embodiments of the present invention.

DESCRIPTION OF SPECIFIC EMBODIMENTS OF THE INVENTION

The present invention, in some embodiments thereof, relates to vehicle inspection and, more particularly, but not exclusively, to multi-modal vehicle damage comparison with viewpoint invariance.

As described in the Background, vehicle inspection systems employing multi-camera arrays capture frames of vehicles under conditions that vary between scans due to changes in vehicle position, velocity, lighting, and environmental factors. These variations are introduced by the physical capture environment—they arise from the mechanical and optical properties of the inspection hardware and the dynamics of the vehicle passing through the drive-through lane. As a result, existing single-modality comparison approaches (whether purely geometric or purely semantic) produce unreliable damage assessments when applied across the full range of capture conditions encountered in production inspection environments. Purely geometric approaches fail when viewpoint differences are large or when non-rigid vehicle components distort the geometric relationship between frames. Purely semantic approaches may be computationally expensive to apply to all comparisons and may lack spatial precision for damage localization.

Embodiments of the present invention address this technical problem by providing a multi-modal damage comparison pipeline that is specifically integrated with the physical and operational constraints of a multi-camera vehicle inspection system. In some embodiments, the pipeline improves the functioning of the inspection system itself by: (a) reducing false-positive and false-negative damage classification errors inherent to single-modality approaches by adaptively selecting between geometric and semantic comparison pathways based on measurable quality metrics of the geometric transformation, (b) improving computational throughput of the inspection system by propagating frame correspondences across camera groups, thereby reducing redundant embedding computations proportional to camera group size, and (c) improving the reliability of homography estimation by filtering keypoint correspondences using vehicle-specific semantic segmentation masks that exclude non-rigid and unreliable vehicle regions a filtering step that is specific to the domain of vehicle body comparison and would not arise in general-purpose image matching.

These improvements are not directed to an abstract idea of "comparing images" or "classifying damage" but rather to specific technical modifications to the data processing pipeline of a multi-camera vehicle inspection system that reduce specific, identified error modes in the system's output.

As used herein, a "scan" refers to a vehicle capture event comprising a set of frames captured by a plurality of cameras associated with the inspection system during a single vehicle pass through a vehicle drive-through lane. A "previous scan" may further comprise stored inspection outputs, including damage annotations, associated with an earlier capture event. A "current scan" refers to a later scan relative to the previous scan. The previous scan and the current scan may be separated by minutes, hours, days, weeks, or months.

As used herein, "feature vectors" refer to numerical representations extracted from frames of a scan and usable to identify corresponding frames. "Embedding vectors" are a type of feature vector produced by a model, for example a self-supervised vision model such as a vision transformer trained with self-supervised learning objectives.

As used herein, "corresponding frames" or "corresponding frame pairs" refer to a current frame and a previous frame selected as a matched pair based on a comparison of feature vectors computed for the current frame and the previous frame. A corresponding frame pair depicts overlapping or substantially similar regions of a vehicle exterior, as determined by a similarity measure applied to the respective feature vectors.

As used herein, "predetermined vehicle regions" refer to regions designated for exclusion from keypoint correspondence filtering during geometric transformation estimation. Predetermined vehicle regions may be determined by vehicle part segmentation and include regions where keypoint correspondences would be unreliable for planar homography estimation due to non-rigidity, reflectivity, insufficient size, or other physical properties of the corresponding vehicle component.

As used herein, a "damage annotation" refers to a data structure associated with a detected damage region in a frame, comprising at least one of a bounding box specifying a location of the damage region within the frame, a damage type identifier, a damage severity indicator, a vehicle part identifier, and a timestamp.

As used herein, a "damage classification" in the context of a damage assessment refers to a determination of whether a detected damage region in a current scan corresponds to new damage that was not present in the previous scan or to pre-existing damage that was present in the previous scan.

As used herein, a "geometric transformation" refers to a mathematical mapping between coordinate systems of two frames, including but not limited to a homography transformation, which maps points in one frame to corresponding points in another frame under an assumption of a planar or approximately planar surface.

As used herein, a "quality metric" refers to a quantitative measure of the reliability of a geometric transformation, including but not limited to an inlier count, a reprojection error, a frame similarity score, or a combination thereof.

As used herein, a "camera array" refers to a plurality of cameras arranged at predetermined positions along a vehicle drive-through lane such that the cameras collectively capture substantially all exterior surfaces of a vehicle during a single vehicle pass. A camera array may comprise side-facing cameras, top-facing cameras, and angled cameras, and may further comprise illumination sources. A "camera group" refers to a subset of cameras within the camera array that have overlapping or adjacent fields of view and are physically proximate to one another.

As used herein, a "vehicle inspection database" refers to a persistent data store that maintains vehicle records, each vehicle record associated with one or more scans, damage annotations, damage assessments, and metadata.

As used herein, a "differential damage report" refers to a structured output that identifies changes in damage state between a current scan and a previous scan for a vehicle, including newly detected damage, damage that has worsened, damage that has been repaired, and damage that is unchanged.

As used herein, "coordinate-aware asymmetric visual prompting" refers to a technique for constructing input to a model configured to process image and text inputs, wherein a visual marker (such as a bounding box) is overlaid on a current frame at a location of a damage region but is not overlaid on a corresponding previous frame, and wherein coordinate information specifying the location of the damage region is provided as textual input. The asymmetry is configured to direct the model's attention to the damage region in the current frame without biasing the model toward identifying damage at a corresponding location in the previous frame.

Referring now to the drawings, FIG. 1 illustrates a block diagram of an inspection system 100 for vehicle damage assessment, in accordance with some embodiments of the present invention. The inspection system 100 comprises at least one processor 110 and at least one memory 120 storing instructions that, when executed by the at least one processor 110, cause the inspection system 100 to perform operations described herein, including the operations illustrated in FIG. 2.

In one or more embodiments, the inspection system 100 further comprises a camera array 130 comprising a plurality of cameras arranged along a vehicle drive-through lane. The camera array 130 may be communicatively coupled to the at least one processor 110 via wired or wireless communication links. In some embodiments, the camera array 130 comprises at least four cameras, and in further embodiments at least eight cameras, positioned to collectively capture substantially all exterior surfaces of a vehicle as the vehicle passes through the drive-through lane. The cameras may include side-facing cameras, top-facing cameras, downward-angled cameras, and upward-angled cameras. Each camera may be associated with a camera identifier and a known position and orientation relative to the drive-through lane.

In one or more embodiments, the inspection system 100 further comprises one or more illumination sources arranged along the vehicle drive-through lane. The illumination sources may be configured to provide controlled illumination during a vehicle pass.

In one or more embodiments, the inspection system 100 further comprises a vehicle inspection database configured to store vehicle records. Each vehicle record may be associated with one or more scans, damage annotations, damage assessments, differential damage reports, and metadata.

In one or more embodiments, the inspection system 100 may be communicatively coupled to one or more external systems including at least one of a fleet management system, an insurance processing system, a rental management system, and a regulatory compliance system. The inspection system 100 may transmit damage assessment outputs, differential damage reports, and alerts to the one or more external systems.

FIG. 2 illustrates a flowchart of example operations performed by the inspection system for vehicle damage assessment, in accordance with some embodiments of the present invention.

In step 210, the system identifies one or more corresponding frame pairs between a current scan and a previous scan based on feature vectors extracted from the current scan and the previous scan, wherein the current scan and the previous scan are captured by a plurality of cameras associated with the inspection system.

In step 220, the system determines a damage assessment for the current scan based on at least one of: the one or more corresponding frame pairs, and when one or more damage annotations from the previous scan exist, one or more damage annotations projected across the one or more corresponding frame pairs using a geometric transformation. In some embodiments, step 220 further comprises adaptively selecting between a geometric comparison pathway and a semantic comparison pathway based on a quality metric.

In step 230, the system provides the damage assessment comprising at least one of a damage classification, a confidence score, and metadata for the current scan, wherein the current scan and the previous scan are captured under different capture conditions comprising at least one of different camera positions, different lighting conditions, and different time intervals. In some embodiments, step 230 further comprises storing the damage assessment in association with a vehicle record in a vehicle inspection database, generating a differential damage report, and transmitting an output to one or more external systems.

In one or more embodiments of the present invention, the system may implement a hierarchical, multi-modal pipeline for comparing vehicle damage across temporal scans.

The pipeline may be organized as three integrated tiers that operate in coordination: a first tier for frame matching, a second tier for geometric comparison, and a third tier for semantic comparison. The tiers share a common data context and the system adaptively selects between the second tier and the third tier based on quality metrics, as described below.

In one or more embodiments, the tier organization described herein represents one embodiment of the invention and the functional components may be implemented in other configurations without departing from the scope of the invention. In some embodiments, the system may implement any one or more of the tiers.

In one or more embodiments of the present invention, the first tier (corresponding to step 210 of FIG. 2) may identify one or more corresponding frame pairs between current and previous vehicle scans using self-supervised vision embeddings extracted from a foundation vision model.

In one or more embodiments, the system employs a self-supervised vision transformer model (e.g., a Vision Transformer (ViT) trained with self-supervised learning objectives such as DINOv2) to extract high-dimensional embedding vectors from each frame. In some embodiments, the input resolution may be configurable (e.g., 518×518 pixels). In some embodiments, the output may be a high-dimensional embedding vector (e.g., 384 to 1536 dimensions). In some embodiments, the embedding vectors may be L2 normalized for cosine similarity computation. Self-supervised vision models are trained without labeled data on large-scale image datasets, learning representations that generalize across lighting, viewing angle, and surface appearance variations without being trained specifically on vehicle inspection data.

In one or more embodiments of the present invention, the frame matching algorithm may comprise: computing a similarity matrix using cosine similarity between L2-normalized embedding vectors of the current scan and the previous scan, scaling similarity scores to an interpretable range of zero to one, and returning top-K matches per frame above a configurable similarity threshold.

In one or more embodiments of the present invention, each of the one or more corresponding frame pairs may be associated with at least one of: a current scan frame identifier, a previous scan frame identifier, a similarity score, a confidence metric, a timestamp associated with the current scan, a timestamp associated with the previous scan, and a camera identifier.

In one or more embodiments of the present invention, the system may propagate frame correspondences from a representative camera of a plurality of cameras to other cameras in a predefined camera group. A camera group comprises cameras that have overlapping or adjacent fields of view and are physically proximate within the camera array. The system designates a representative camera for each camera group and computes frame matching only for the representative camera. Frame correspondences identified for the representative camera are then propagated to all other cameras in the camera group by applying a known spatial offset between the representative camera and each other camera. This may reduce the number of embedding computations by a factor proportional to the camera group size while maintaining matching accuracy through strategic representative camera selection. For example, in an inspection system with 24 cameras organized into 6 camera groups of 4 cameras each, the system may compute embedding vectors for 6 representative cameras instead of 24, reducing computational cost by approximately 75%.

In one or more embodiments, the frame matching tier may process each frame (e.g., in 30-100 ms per frame when executed on a graphics processing unit (GPU)). In some embodiments, matching computation across frame pairs may be performed (e.g., in less than 10 ms for a matrix of 100×100 frame pairs). In some embodiments, the system may achieve a frame match accuracy (e.g., 95% correct frame correspondences).

In one or more embodiments of the present invention, the second tier may project damage annotations from previous scans to current scans using dense feature matching and homography transformation with vehicle-aware filtering.

In one or more embodiments of the present invention, the system may employ a learned dense correspondence estimator based on a transformer architecture (e.g., RoMa (Robust Matching)) to extract keypoint correspondences between frame pairs. In some embodiments, the dense feature matcher may output thousands of keypoint correspondences per frame pair (e.g., 5000 or more) with per-match confidence scores. In some embodiments, the dense feature matcher may operate in a configurable precision/speed tradeoff mode.

In one or more embodiments of the present invention, the system may filter feature matches based on vehicle part segmentation. The system applies a vehicle part segmentation model to at least one of the current frame and the corresponding previous frame to identify regions corresponding to specific vehicle parts. The system may then create vehicle masks designating predetermined vehicle regions for exclusion.

In some embodiments, the predetermined vehicle regions may comprise at least one of: rotating vehicle components (e.g., wheels and tires) which may have variable position, light-reflective surfaces (e.g., windows and windshields) which may be transparent and suffer from depth ambiguity, surfaces containing alphanumeric text (e.g., license plates) which may create spurious keypoint matches, moving vehicle components (e.g., wipers) which may be in different positions, vehicle components having dimensions insufficient to produce reliable keypoint correspondences (e.g., turn signals, emblems, and small decorative elements), and background regions visible around the vehicle.

In some embodiments, the system may filter keypoint correspondences such that both the source keypoint and the target keypoint fall within valid vehicle body regions (i.e., regions outside the predetermined vehicle regions). This filtering improves homography estimation robustness by excluding regions that violate planar transformation assumptions or that produce unreliable keypoint correspondences. The vehicle-aware filtering is a domain-specific step that distinguishes the present system from general-purpose image matching systems, which do not account for the physical properties of specific vehicle components when estimating geometric transformations.

In one or more embodiments of the present invention, the system may apply numerical stability techniques to homography estimation to address numerical instability that arises from the range of pixel coordinate values in high-resolution frames.

In some embodiments, the system may normalize keypoint coordinates such that the centroid of the keypoint coordinates is at the origin and the average distance from the origin is $\sqrt{2}$ (e.g., using the Hartley-Zisserman normalization method). In some embodiments, the system may adjust the RANSAC threshold for the normalized coordinate space. In some embodiments, the system may perform RANSAC-based homography estimation in the normalized coordinate space. In some embodiments, the system may denormalize the computed homography transformation back to the original coordinate space. In some embodiments, the system may perform iterative refinement with a decreasing threshold. In some embodiments, the system may track quality metrics comprising at least one of an inlier count and a reprojection error.

In one or more embodiments of the present invention, the system may project one or more damage annotation bounding boxes through a sequential process comprising: converting normalized bounding box coordinates (e.g., in the range [0,1]) to pixel coordinates, extracting four corner points of each of the one or more damage annotation bounding boxes in pixel space, applying the homography transformation to the extracted corner points, computing a new axis-aligned bounding box from the transformed corner points, clipping the computed axis-aligned bounding box to the destination image bounds of the current frame, validating that the clipped computed axis-aligned bounding box has a positive area, and renormalizing the validated clipped computed axis-aligned bounding box to a normalized coordinate space (e.g., [0,1]).

In one or more embodiments of the present invention, the system may inject one or more projected damage annotations into the detection pipeline of the inspection system. In some embodiments, each injected projected damage annotation may comprise at least one of: source identification metadata, an original damage identifier, a projection confidence score, and a non-synthetic flag enabling participation in clustering and reporting of detected damages from the current scan without requiring special case handling. The non-synthetic flag ensures that the projected damage annotations are processed by downstream pipeline stages identically to newly detected damage annotations, enabling unified damage comparison without requiring modifications to existing pipeline logic.

In one or more embodiments of the present invention, the geometric comparison may be configured using one or more of the following parameters: a per-match confidence threshold (e.g., in the range [0,1]), a vehicle mask filter enable parameter, a RANSAC inlier threshold in pixels, a minimum inlier count for valid homography, a post-RANSAC refinement iteration count, and a vehicle mask dilation factor.

In one or more embodiments, the geometric comparison may exhibit the following typical performance characteristics: dense feature matching of approximately 200-400 ms per frame pair on GPU, vehicle mask creation of approximately 30-80 ms per frame, homography estimation of less than approximately 10 ms per frame pair, and projected damage annotation bounding box projection of less than approximately 1 ms per bounding box.

In one or more embodiments of the present invention, the third tier may perform semantic damage comparison using a model configured to process image and text inputs (e.g., a VLM) with coordinate-aware asymmetric visual prompting.

In some embodiments, the third tier may operate on cases where geometric comparison is insufficient, as determined by one or more quality metrics. The system may adaptively select between the second tier and the third tier as follows: the system may use the second tier (geometric comparison) when frame similarity exceeds a first threshold and homography inlier count exceeds a second threshold; the system may invoke the third tier (semantic comparison) when homography estimation fails, when the inlier count is below the second threshold, or when reprojection error exceeds a third threshold; and the system may invoke the third tier for validation in ambiguous cases falling between the thresholds.

The adaptive tier selection is a technical improvement specific to the multi-modal pipeline: by evaluating measurable properties of the geometric transformation (inlier count, reprojection error, frame similarity) and routing to a semantic fallback only when the geometric approach is demonstrably unreliable, the system avoids the computational cost of semantic comparison for cases that can be resolved geometrically while ensuring that difficult cases receive the additional semantic analysis necessary for accurate classification.

In one or more embodiments of the present invention, the third tier may receive as input a current frame depicting a damage region with a visual marker, a corresponding previous frame depicting a corresponding region without a visual marker, damage metadata comprising at least one of a vehicle part identifier and a damage type, and previous detections for matching purposes.

In one or more embodiments, the third tier may employ coordinate-aware asymmetric visual prompting comprising: overlaying a damage annotation bounding box on the current frame at a location corresponding to the damage region without overlaying a damage annotation bounding box on the corresponding previous frame, cropping both the current frame and the corresponding previous frame to a region around the damage annotation bounding box with configurable padding (e.g., 20%), and calculating and providing crop-relative coordinates of the damage region as text within the prompt.

The asymmetric visual marking approach, wherein a damage annotation bounding box is overlaid on the current frame only, is a specific technical technique that addresses a specific technical problem: if a bounding box were overlaid on both frames, the model may be biased toward identifying damage at the marked location in the previous frame regardless of whether damage actually exists at that location, leading to increased false-positive classifications of pre-existing damage. By marking only the current frame and providing coordinate information textually, the system directs the model's spatial attention to the correct region while allowing the model to make an unbiased assessment of whether corresponding damage exists in the previous frame. This is not a mere formatting choice but a technique that measurably reduces classification errors.

In one or more embodiments of the present invention, the prompt provided to the model may comprise a set of reference examples covering at least one of: an example where identical damage is present in both a current frame and a corresponding previous frame, an example where the current frame depicts a damaged surface and the corresponding previous frame depicts a clean surface, an example of existing damage where the current frame and the corresponding previous frame depict a lighting difference, an example where the current frame depicts new damage and the corresponding previous frame depicts visual noise without damage (e.g., water droplets or reflections), and an example of existing damage that is subtle in the corresponding previous frame.

In some embodiments, the prompt may further comprise a task definition specifying classification as NEW or EXISTING and one or more considerations relating to at least one of lighting variation, subtle damage, and vehicle part context.

The model response may be parsed by the third tier according to a structured output format such that the third tier extracts at least one of: a damage classification (e.g., NEW or EXISTING), a confidence score (e.g., in the range [0.0, 1.0]), metadata, and a reasoning output for the damage region that provides a detailed explanation of the comparison logic. In some embodiments, when structured parsing of the model response fails, the system may apply keyword-based classification as a fallback mechanism.

In one or more embodiments of the present invention, when the damage classification indicates existing damage, the third tier may link the damage to a previous detection record using spatial matching comprising: filtering candidate previous detections by vehicle part identifier which may require a match, filtering candidate previous detections by a crop visibility threshold within the crop region which may require minimum overlap, and computing a weighted score based on at least one of an intersection-over-union (e.g., weighted at 60%), a centroid distance (e.g., weighted at 30%), and a size similarity (e.g., weighted at 10%). In some embodiments, a valid match may require the weighted score to satisfy at least one of a minimum intersection-over-union threshold or a maximum centroid distance threshold, and a minimum visibility threshold within the crop region.

In one or more embodiments of the present invention, the third tier may be configured by one or more parameters comprising: a model parameter identifying the model configured to process image and text inputs, a maximum response token parameter, a sampling temperature parameter, a padding factor parameter defining padding around the damage region, an intersection-over-union threshold parameter for detection matching, and a distance threshold parameter for detection matching.

In one or more embodiments of the present invention, the third tier may interface with a model configured to process image and text inputs through a unified API, receiving as input a text prompt with two images (e.g., base64-encoded images) and returning a structured response. In some embodiments, the model may be configured with one or more of a temperature parameter and a token limit parameter.

The model configured to process image and text inputs may comprise any of a variety of VLMs, including but not limited to Qwen-VL, Claude, GPT, or Gemini.

In one or more embodiments, the third tier may exhibit one or more of the following performance characteristics: a model inference time (e.g., between approximately 2 and 8 seconds per comparison), a damage classification accuracy (e.g., approximately 90%), and a detection matching time (e.g., less than 1 ms per comparison).

In one or more embodiments of the present invention, the damage assessment output may be used to perform one or more downstream actions comprising at least one of: storing the damage assessment in association with a vehicle identifier in a vehicle inspection database, updating a damage history timeline for the vehicle reflecting damage state changes across temporal scans, generating a differential damage report identifying newly detected damage, unchanged pre-existing damage, worsened damage, and repaired damage, transmitting an alert to a fleet management system identifying newly detected damage requiring maintenance action, transmitting a damage verification report to an insurance processing system for claim adjudication, generating a driver accountability report for a rental or ride-sharing operator identifying damage attributable to a specific rental or ride period, and flagging a vehicle for human review when the confidence score falls below a review threshold.

In one or more embodiments, the damage assessment output may further comprise, for each damage region, a comparison pathway indicator identifying whether the damage classification was produced by the geometric comparison pathway or the semantic comparison pathway, a confidence score, and a reasoning output when produced by the semantic comparison pathway. The comparison pathway indicator and confidence score provide an audit trail that enables human reviewers and downstream systems to understand and verify the basis for each damage classification.

The following non-limiting examples illustrate the operation of the inspection system in representative commercial contexts.

Example 1: Rental car return. A rental car is scanned upon return after a three-day rental period. The current scan captures frames under overcast daytime lighting. The previous scan (at rental pickup) was captured under artificial indoor lighting. The first tier identifies corresponding frame pairs despite the lighting change. For a scratch detected on the rear bumper, the second tier estimates a homography transformation with 85 inliers and low reprojection error. The projected damage annotation from the previous scan aligns with the detected scratch, and the system classifies the damage as pre-existing with high confidence. For a dent detected on the passenger door, the homography estimation produces only 12 inliers due to a large viewpoint difference (the vehicle was positioned differently in the lane). The system's quality metric falls below the threshold, and the system routes to the third tier. The VLM examines the cropped current frame (with asymmetric bounding box) and the corresponding previous frame and determines that no corresponding damage is present in the previous frame, classifying the dent as new damage with a confidence score of 0.92. The system generates a differential damage report identifying the dent as new damage and the scratch as pre-existing, and transmits the report to the rental management system.

Example 2: Fleet maintenance tracking. A delivery fleet operates 200 vehicles that are scanned weekly. For a particular vehicle, the system detects a crack in the windshield trim that was not annotated in the previous scan. Because the trim region involves a light-reflective surface adjacent to the windshield, keypoint correspondences in the region are filtered out by the vehicle-aware mask filtering. The system routes to the third tier, which identifies the crack as new damage. The system updates the vehicle's damage history timeline and transmits an alert to the fleet management system prioritizing maintenance.

Example 3: Insurance claim verification. An insurance company requests verification of a damage claim for a side panel dent. The system retrieves the most recent pre-claim scan and the post-claim scan. The first tier matches corresponding frame pairs. The second tier projects the damage annotation and confirms the dent is present in both scans with high geometric alignment quality. The system classifies the damage as pre-existing, contradicting the claim, and generates a damage verification report with frame images, projected annotations, and confidence scores for the insurance adjudicator.

In one or more embodiments, the system may provide a unified pipeline combining self-supervised vision embeddings, dense feature matching, and VLM reasoning for vehicle damage comparison under different capture conditions which may comprise at least one of: camera positions, camera angles, lighting conditions, and time intervals. The hybrid geometric and semantic architecture enables robust damage comparison across conditions where neither geometric methods alone nor semantic methods alone would achieve reliable accuracy.

In one or more embodiments, the vehicle-aware keypoint filtering constitutes a technical improvement specific to the domain of vehicle body inspection. General-purpose dense correspondence estimators do not distinguish between rigid body panels, rotating wheels, reflective windows, and textual surfaces. By integrating vehicle part segmentation to filter keypoint correspondences prior to homography estimation, the system excludes correspondences that would violate the planar surface assumption underlying homography estimation, thereby producing more accurate geometric transformations for the specific geometry of vehicle exteriors.

In one or more embodiments, the coordinate-aware asymmetric visual prompting constitutes a technical improvement to the process of submitting multi-image comparison queries to a model configured to process image and text inputs. Symmetric prompting (where both images receive visual markers) introduces a systematic bias that increases false-positive classifications. Asymmetric prompting with crop-relative coordinates directs model attention without introducing this bias, improving classification accuracy for damage comparisons.

In one or more embodiments, the camera group propagation constitutes a technical improvement to the computational efficiency of the frame matching tier. By computing embedding vectors only for representative cameras and propagating correspondences to co-located cameras, the system reduces embedding computation proportionally to camera group size without requiring retraining of the embedding model.

In one or more embodiments, the injection of projected damage annotations into the detection pipeline with non-synthetic flags constitutes a technical improvement to pipeline integration. By enabling projected damage annotations to participate in downstream clustering and reporting identically to newly detected annotations, the system avoids the need for separate processing logic and reduces integration complexity.

It is expected that during the life of a patent maturing from this application many relevant technologies will be developed and the scope of the terms "self-supervised vision model," "learned dense correspondence model," and "model configured to process image and text inputs" is intended to include all such new technologies apriori.

As used herein the term "approximately" refers to ±10%.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the Applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. An inspection system for vehicle damage assessment comprising:

a camera array comprising a plurality of cameras arranged along a vehicle drive-through lane, the camera array configured to capture a plurality of frames of a vehicle exterior during a vehicle pass;

at least one processor communicatively coupled to the camera array; and at least one memory storing instructions that, when executed by the at least one processor, cause the system to:

receive a current scan comprising a plurality of current frames captured by the camera array during a current vehicle pass and a previous scan comprising a plurality of previous frames captured by the camera array during a previous vehicle pass of a same vehicle;

identify one or more corresponding frame pairs between the current scan and the previous scan by computing feature vectors from the current frames and the previous frames and selecting frame pairs based on a similarity measure applied to the feature vectors;

determine a damage assessment for the current scan by projecting one or more damage annotations from the previous scan onto one or more current frames of the one or more corresponding frame pairs using a geometric transformation estimated from keypoint correspondences between each corresponding frame pair; and store the damage assessment in association with a vehicle record in a vehicle inspection database, the damage assessment comprising a damage classification indicating whether damage depicted in the current scan is new damage or pre-existing damage, a confidence score, and metadata linking the damage classification to at least one frame of the current scan.

2. The inspection system of claim 1, wherein the instructions further cause the system to adaptively select between a geometric comparison pathway and a semantic comparison pathway based on a quality metric derived from the geometric transformation, wherein the semantic comparison pathway is invoked when the quality metric falls below a threshold.

3. The inspection system of claim 2, wherein the geometric comparison pathway comprises projecting the one or more damage annotations using a homography transformation estimated from filtered keypoint correspondences, and the semantic comparison pathway comprises submitting paired frames with coordinate-aware asymmetric visual prompting to a model configured to process image and text inputs.

4. The inspection system of claim 2, wherein the quality metric comprises at least one of: an inlier count from the geometric transformation estimation, a reprojection error, and a frame similarity score.

5. The inspection system of claim 1, wherein the one or more corresponding frame pairs are identified using embedding vectors from a self-supervised vision model, the embedding vectors being L2-normalized, and the similarity measure comprises cosine similarity.

6. The inspection system of claim 1, wherein each of the one or more corresponding frame pairs is associated with at least one of: a current scan frame identifier, a previous scan frame identifier, a similarity score, a confidence metric, a timestamp associated with the current scan, a timestamp associated with the previous scan, and a camera identifier.

7. The inspection system of claim 1, wherein the instructions further cause the system to propagate frame correspondences from a representative camera to other cameras in a predefined camera group, the predefined camera group comprising cameras having overlapping or adjacent fields of view within the camera array.

8. The inspection system of claim 1, wherein the camera array comprises at least four cameras, the plurality of frames captured per vehicle pass comprises at least twenty frames, and the current vehicle pass and the previous vehicle pass are separated by at least one hour.

9. The inspection system of claim 1, wherein the instructions further cause the system to perform at least one of: updating a damage history timeline for the vehicle, generating a differential damage report identifying changes between the current scan and the previous scan, and transmitting an alert to an external system.

10. The inspection system of claim 1, wherein projecting one or more damage annotations further comprises:

receiving, from the camera array, a current frame and a corresponding previous frame, the current frame and the corresponding previous frame depicting overlapping regions of an exterior surface of a vehicle;

extracting at least one keypoint correspondence between the current frame and the corresponding previous frame using a learned dense correspondence model;

filtering the at least one keypoint correspondence by excluding keypoints falling within predetermined vehicle regions identified by a vehicle part segmentation model applied to at least one of the current frame and the corresponding previous frame;

estimating a homography transformation from the filtered at least one keypoint correspondence using a point normalization procedure;

projecting one or more damage annotation bounding boxes from the previous frame to the current frame using the estimated homography transformation; and injecting each of the one or more projected damage annotation bounding boxes into a detection pipeline of the vehicle inspection system with metadata indicating a projection origin, the metadata enabling each projected damage annotation bounding box to participate in clustering with newly detected damage annotations in the detection pipeline.

11. The inspection system of claim 10, wherein estimating the homography comprises:

normalizing keypoint coordinates of the filtered at least one keypoint correspondence from an original coordinate space such that a centroid of the keypoint coordinates is at an origin and an average distance from the origin is $\sqrt{2}$;

computing the homography transformation from the normalized keypoint coordinates using a RANSAC procedure with a threshold adjusted for the normalized coordinate space; and denormalizing the computed homography transformation to the original coordinate space.

12. The inspection system of claim 11, wherein computing the homography transformation further comprises iterative refinement with a decreasing inlier threshold.

13. The inspection system of claim 10, wherein projecting the one or more damage annotation bounding boxes comprises:

converting bounding box coordinates from a normalized coordinate space to pixel coordinates;

applying the homography transformation to corner points of each of the one or more damage annotation bounding boxes;

computing an axis-aligned bounding box from the transformed corner points;

clipping the computed axis-aligned bounding box to image bounds of the current frame;

validating the clipped computed axis-aligned bounding box has a positive area; and renormalizing the validated clipped computed axis-aligned bounding box to the normalized coordinate space.

14. The inspection system of claim 10, wherein the predetermined vehicle regions comprise at least one of: rotating vehicle components, light-reflective surfaces, surfaces containing alphanumeric text, moving vehicle components, vehicle components having dimensions insufficient to produce reliable keypoint correspondences, and background regions.

15. The inspection system of claim 10, wherein the metadata further comprises at least one of an original damage identifier from the previous scan, a projection confidence score, and a non-synthetic flag, the non-synthetic flag enabling each projected damage annotation bounding box to be processed identically to newly detected damage annotations in the detection pipeline without special-case handling.

16. An inspection method for vehicle damage assessment using a vehicle inspection system comprising a camera array having a plurality of cameras arranged along a vehicle drive-through lane, the method comprising:

capturing a current scan comprising a plurality of current frames during a current vehicle pass through the vehicle drive-through lane;

retrieving a previous scan comprising a plurality of previous frames and associated damage annotations captured during a previous vehicle pass of a same vehicle;

identifying one or more corresponding frame pairs between the current scan and the previous scan by computing embedding vectors from the current frames and the previous frames using a self-supervised vision model and selecting frame pairs having a cosine similarity above a similarity threshold;

for each corresponding frame pair having an associated damage annotation in the previous scan, performing a geometric comparison comprising estimating a geometric transformation between the corresponding frame pair and projecting the associated damage annotation from a previous frame to a current frame using the estimated geometric transformation;

evaluating a quality metric of the geometric comparison for each corresponding frame pair;

for each corresponding frame pair for which the quality metric falls below a quality threshold, performing a semantic comparison comprising submitting paired frames with coordinate-aware asymmetric visual prompting to a model configured to process image and text inputs and parsing a response from the model to extract a damage classification; and generating a damage assessment output comprising, for each damage region in the current scan, a damage classification indicating whether the damage region depicts new damage or pre-existing damage, a confidence score, and a comparison pathway indicator identifying whether the damage classification was produced by the geometric comparison or the semantic comparison.

17. The method of claim 16, further comprising storing the damage assessment output in association with a vehicle identifier in a vehicle inspection database and generating a differential damage report.

18. The method of claim 16, further comprising propagating frame correspondences from a representative camera to other cameras in a predefined camera group to reduce a number of embedding vector computations.

19. A non-transitory computer-readable medium storing instructions that, when executed by at least one processor communicatively coupled to a camera array comprising a plurality of cameras arranged along a vehicle drive-through lane, cause the at least one processor to perform a method comprising:

receiving a current scan comprising a plurality of current frames captured by the camera array during a current vehicle pass and a previous scan comprising a plurality of previous frames captured by the camera array during a previous vehicle pass of a same vehicle;

identifying one or more corresponding frame pairs between the current scan and the previous scan by computing feature vectors from the current frames and the previous frames and selecting frame pairs based on a similarity measure applied to the feature vectors;

determining a damage assessment for the current scan by projecting one or more damage annotations from the previous scan onto one or more current frames of the one or more corresponding frame pairs using a geometric transformation estimated from keypoint correspondences between each corresponding frame pair; and storing the damage assessment in association with a vehicle record, the damage assessment comprising a damage classification indicating whether damage depicted in the current scan is new damage or pre-existing damage, a confidence score, and metadata linking the damage classification to at least one frame of the current scan.

* * * * *